United States Patent
Sun et al.

(10) Patent No.: US 11,449,270 B2
(45) Date of Patent: Sep. 20, 2022

(54) ADDRESS TRANSLATION METHOD AND SYSTEM FOR KV STORAGE DEVICE

(71) Applicant: BEIJING MEMBLAZE TECHNOLOGY CO., LTD, Beijing (CN)

(72) Inventors: Qingtao Sun, Beijing (CN); Cong Sun, Beijing (CN); Junwei Hou, Beijing (CN)

(73) Assignee: BEIJING MEMBLAZE TECHNOLOGY CO., LTD, Beijing (CN)

( * ) Notice: Subject to any disclaimer, the term of this patent is extended or adjusted under 35 U.S.C. 154(b) by 190 days.

(21) Appl. No.: 17/044,374

(22) PCT Filed: Jun. 26, 2018

(86) PCT No.: PCT/CN2018/092822
§ 371 (c)(1),
(2) Date: Dec. 23, 2020

(87) PCT Pub. No.: WO2019/119764
PCT Pub. Date: Jun. 27, 2019

(65) Prior Publication Data
US 2021/0124522 A1    Apr. 29, 2021

(30) Foreign Application Priority Data

Dec. 21, 2017   (CN) .......................... 201711392529.2

(51) Int. Cl.
*G06F 3/06* (2006.01)
*G06F 12/1018* (2016.01)

(52) U.S. Cl.
CPC .......... *G06F 3/0655* (2013.01); *G06F 3/0604* (2013.01); *G06F 3/0679* (2013.01); *G06F 12/1018* (2013.01)

(58) Field of Classification Search
CPC .... G06F 3/0655; G06F 3/0604; G06F 3/0679; G06F 12/1018; G06F 16/2255; H04L 9/3242
See application file for complete search history.

(56) References Cited

U.S. PATENT DOCUMENTS

2014/0310302 A1   10/2014   Wu et al.
2016/0099810 A1*   4/2016   Li .......................... G11C 15/00
                                                                 713/193

FOREIGN PATENT DOCUMENTS

CN    102073733 A    5/2011
CN    103186668 A    7/2013
(Continued)

OTHER PUBLICATIONS

International Search Report issued in corresponding International Application No. PCT/CN2018/092822; dated Sep. 27, 2018; 5 pgs.
(Continued)

*Primary Examiner* — Idriss N Alrobaye
*Assistant Examiner* — Richard B Franklin
(74) *Attorney, Agent, or Firm* — Hauptman Ham, LLP (57) ABSTRACT

The present application provides an address translation method and system for a KV storage device. The provided address translation method for a read operation for a KV storage device includes: obtaining a logical address accessed by a read operation; and if the logical address hits a cached translation page, obtaining a physical address corresponding to the logical address from the cached translation page.

13 Claims, 6 Drawing Sheets

(56) References Cited

FOREIGN PATENT DOCUMENTS

| CN | 103973810 A | 8/2014 |
| CN | 104156380 A | 11/2014 |

OTHER PUBLICATIONS

Written Opinion issued in corresponding International Application No. PCT/CN2018/092822; dated Sep. 27, 2018; 9 pgs.
Gupta et al.; DFTL: A Flash Translation Layer Employing Demand-based Selective Caching of Page-level Address Mappings; ASPLOS'09, Mar. 7-11, 2009, Washington, DC, USA; 12 pgs.

* cited by examiner

FIG. 1A

Prior Art

| FTL | |
|---|---|
| Hash key 1 | Physical address 1 |
| Hash key 2 | Physical address 2 |
| Hash key 3 | Physical address 3 |
| Hash key 4 | Physical address 4 |

FIG. 1B

Prior Art

ADDRESS TRANSLATION METHOD AND SYSTEM FOR KV STORAGE DEVICE

CROSS REFERENCE TO RELATED APPLICATIONS

The present application is a National Phase of International Application Number PCT/CN2018/092822 filed Jun. 26, 2018 and claims priority to Chinese Patent Application No. 201711392529.2, filed on Dec. 21, 2017.

TECHNICAL FIELD

The present application relates to a KV storage device, and specifically, to an address translation method and system for a KV storage device.

BACKGROUND

Figure 1A:
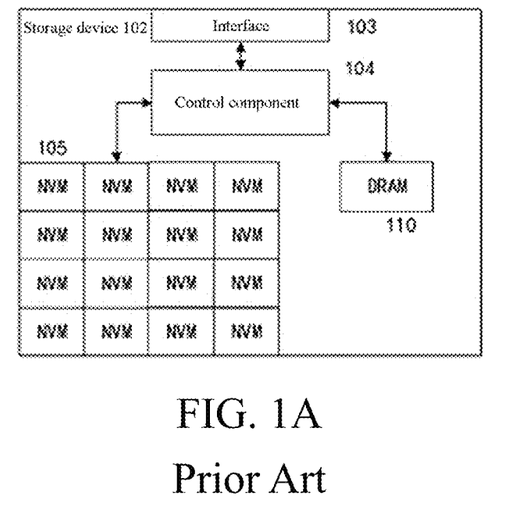
FIG. 1A is a block diagram of a solid-state storage device in the related art.

FIG. 1A shows a block diagram of a solid-state storage device. A solid-state storage device 102 is coupled to a host and configured to provide storage capability for the host. The host may be coupled to the solid-state storage device 102 in various ways, including but not limited to, for example, a Serial Advanced Technology Attachment (SATA), a Small Computer System Interface (SCSI), a Serial Attached SCSI (SAS), Integrated Drive Electronics (IDE), a Universal Serial Bus (USB), Peripheral Component Interconnect Express (PCIE), NVM Express (NVMe), the Ethernet, a fiber channel, a wireless communication network, etc. The host may be an information processing device capable of communicating with the storage device in the manner above, for example, a personal computer, a tablet computer, a server, a portable computer, a network switch, a router, a cellular phone, a personal digital assistant, etc. The storage device 102 includes an interface 103, a control component 104, one or more NVM chips 105, and a Dynamic Random Access Memory (DRAM) 110.

A NAND flash, a phase change memory, a Ferroelectric RAM (FeRAM), a Magnetic Random Access Memory (MRAM), a Resistive Random Access Memory (RRAM), etc. are common NVMs.

The interface 103 may be adapted to exchange data with the host in the ways such as an SATA, IDE, a USB, PCIE, NVMe, an SAS, the Ethernet, and a fiber channel.

The control component 104 is configured to control data transmission between the interface 103, the NVM chip 105, and the DRAM 110, and is also configured for storage management, mapping from the logical address of the host to the physical address of the flash, erasure equalization, bad block management, etc. The control component 104 may be implemented in various ways including software, hardware, firmware, or a combination thereof. For example, the control component 104 may be implemented in the form such as a Field-Programmable Gate Array (FPGA), an Application Specific Integrated Circuit (ASIC), or a combination thereof. The control component 104 may also include a processor or a controller, in which software is executed to manipulate the hardware of the control component 104 to process an Input/Output (IO) command. The control component 104 may also be coupled to the DRAM 110 and can access data of the DRAM 110. The DRAM can store an FTL table and/or cached IO command data.

The control component 104 includes a flash interface controller (or referred to as a medium interface controller or a flash channel controller). The flash interface controller is coupled to the NVM chip 105 and issues a command to the NVM chip 105 in the manner of following the interface protocol of the NVM chip 105, to operate the NVM chip 105 and receive a command execution result output from the NVM chip 105. The known interface protocol of the NVM chip includes "Toggle", "ONFI", etc.

A memory target is one or more Logic UNits (LUNs) sharing a Chip Enable (CE) signal in a NAND flash package. The NAND flash package may include one or more dies. Typically, the LUN corresponds to a single die. The LUN may include multiple planes. The multiple planes in the LUN can be accessed in parallel, and multiple LUNs in a NAND flash chip can execute commands and report statuses independently of each other.

Data is generally stored in and read from a storage medium in pages, while data is erased in blocks. A block (also referred to as a physical block) includes multiple pages. The block includes multiple pages. A page (referred to as a physical page) on the storage medium has a fixed size, for example, 17664 bytes. The physical page may also have other sizes.

In a solid-state storage device, a Flash Translation Layer (FTL) is used to maintain mapping information from a logical address to a physical address. The logical address constitutes the storage space of the solid-state storage device perceived by upper-layer software such as an operating system. The physical address is an address used for accessing the physical storage unit of the solid-state storage device. In the related art, an intermediate address form can also be used to implement address mapping. For example, the logical address is mapped to an intermediate address, and then the intermediate address is further mapped to the physical address.

The table structure that stores the mapping information from the logical address to the physical address is referred to as an FTL table. The FTL table is important metadata in the solid-state storage device. Generally, the data items of the FTL table record an address mapping relationship in the solid-state storage device in units of data pages.

The FTL table includes multiple FTL table entries (or referred to as table items). In one case, each FTL table entry records a correspondence between one logical page address and one physical page. In another case, each FTL table entry records correspondences between multiple consecutive logical page addresses and multiple consecutive physical pages. In yet another case, each FTL table entry records a correspondence between a logical block address and a physical block address. In still another case, the FTL table records a mapping relationship between a logical block address and a physical block address, and/or a mapping relationship between a logical page address and a physical page address.

In "DFTL: A Flash Translation Layer Employing Demand-based Selective Caching of Page-level Address Mappings", an improved FTL table method and an application thereof in a solid-state storage device are disclosed. The full text can be obtained from http://www.cse.psu.edu/~buul/papers/ps/dftl-asplos09.pdf.

A storage device that supports a Key-Value (key-data, also abbreviated as "KV") storage model provides a key-based read operation (Get (Key)) and write operation (Put (Key, Value)). To perform the write operation, the host provides a key and data (value) for the storage device to write data into the storage device, and takes the key as an index of the written data. To perform the read operation, the host provides a key for the storage device, and the storage device finds data according to the key and provides the data to the host. Therefore, in a KV storage system, the key is an index used for accessing data, and the data (value) is the accessed data. Generally, the lengths of the key and the data are not fixed lengths. Moreover, optionally, in order to reduce complexity, the length of the key and/or the data may have a specified range.

Figure 1B:
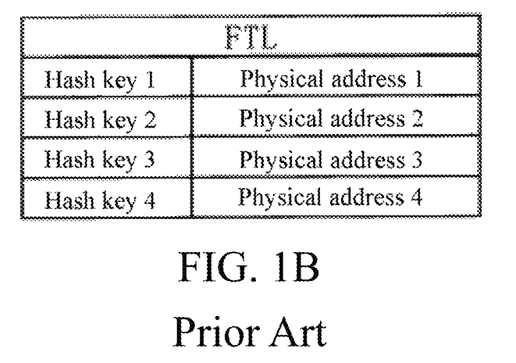
FIG. 1B shows a schematic diagram of an address translation system for a solid-state storage device in the prior art.

FIG. 1B shows a schematic diagram of an address translation system for a solid-state storage device in the prior art. The address translation system (also referred to as an FTL table) for a solid-state storage device that supports a KV storage model provides mapping a hash value obtained from a key (denoted as a hash key) to a physical address (for example, a Physical Page Address (PPA)). Optionally, in addition to the PPA, the physical address recorded in the FTL table may be the starting address of a data frame inside a physical page. The data frame is a data unit having a fixed size, and the physical page includes one or more data frames.

The length of the key provided by a host is not fixed, and the length of data is not fixed. A hash operation is performed on the variable-length key to obtain a fixed-length hash key (for example, 4 bytes/8 bytes), which is taken as an index of the FTL table. The hash key is used as the index to query the FTL table to obtain the corresponding physical address. The FTL table can be implemented by various data structures such as an array, a linked list, and a tree.

SUMMARY

The purpose of the present application includes providing a data access method based on a KV model and a solid-state storage device thereof.

According to a first aspect of the present application, provided is a first method for a KV read operation according to the first aspect of the present application, including: obtaining a key (K) accessed by a read operation; performing hash calculation on the key to obtain a hash key (HK); querying a first hash table according to a first part (HK1) of the hash key; and if a corresponding entry of the first part (HK1) of the hash key in the first hash table records a physical address that stores a value (V) to be accessed by the read operation, reading first data from a storage medium according to the physical address.

According to the first method for a KV read operation according to the first aspect of the present application, provided is a second method for a KV read operation according to the first aspect of the present application, further including: if the corresponding entry of the first part (HK1) of the hash key in the first hash table records the address of a second hash table, querying the second hash table according to a second part (HK2) of the hash key.

According to the first or second method for a KV read operation according to the first aspect of the present application, provided is a third method for a KV read operation according to the first aspect of the present application, further including: if there is no corresponding entry for the first part (HK1) of the hash key in the first hash table, indicating that the key accessed by the read operation does not exist.

According to one of the first to third methods for a KV read operation according to the first aspect of the present application, provided is a fourth method for a KV read operation according to the first aspect of the present application, where the length of the first part (HK1) of the hash key is less than that of the hash key (HK), and the length of the second part (HK2) of the hash key is less than that of the hash key (HK).

According to one of the first to fourth methods for a KV read operation according to the first aspect of the present application, provided is a fifth method for a KV read operation according to the first aspect of the present application, including: obtaining a first key (Kp) from the first data, and if the first key (Kp) matches the key (K), responding to the read operation using the value (V) obtained from the first data.

According to the fifth method for a KV read operation according to the first aspect of the present application, provided is a sixth method for a KV read operation according to the first aspect of the present application, further including: if the first key (Kp) is not matched with the key (K), indicating that the key accessed by the read operation does not exist.

According to the second method for a KV read operation according to the first aspect of the present application, provided is a seventh method for a KV read operation according to the first aspect of the present application, further including: if there is no corresponding entry for the second part (HK2) of the hash key in the second hash table, indicating that the key accessed by the read operation does not exist.

According to the second or seventh method for a KV read operation according to the first aspect of the present application, provided is an eighth method for a KV read operation according to the first aspect of the present application, further including: if a corresponding entry of the second part (HK2) of the hash key in the second hash table records the physical address that stores the value (V) to be accessed by the read operation, reading the second data from the storage medium according to the physical address.

According to the eighth method for a KV read operation according to the first aspect of the present application, provided is a ninth method for a KV read operation according to the first aspect of the present application, further including: if the corresponding entry of the second part (HK2) of the hash key in the second hash table records the address of a conflict table, querying the conflict table according to the key (K).

According to the eighth or ninth method for a KV read operation according to the first aspect of the present application, provided is a tenth method for a KV read operation according to the first aspect of the present application, further including: obtaining a second key (Kp) from the second data, and if the second key (Kp) matches the key (K), responding to the read operation using the value (V) obtained from the second data.

According to the tenth method for a KV read operation according to the first aspect of the present application, provided is an eleventh method for a KV read operation according to the first aspect of the present application, further including: if the second key (Kp) is not matched with the key (K), indicating that the key accessed by the read operation does not exist.

According to the second or seventh method for a KV read operation according to the first aspect of the present application, provided is a twelfth method for a KV read operation according to the first aspect of the present application, including: if the corresponding entry of the second part (HK2) of the hash key in the second hash table records the physical address that stores the value (V) to be accessed by the read operation, comparing the length of the second key recorded in the entry and the length of the key to identify whether the second key (Kp) matches the key (K).

According to one of the first to fourth methods for a KV read operation according to the first aspect of the present application, provided is a thirteenth method for a KV read operation according to the first aspect of the present application, further including: obtaining the length of the first key (Kp) from the corresponding entry of the first part (HK1) of the hash key in the first hash table, and comparing the length of the first (Kp) key with the length of the key (K) to identify whether the first key (Kp) matches the key (K).

According to the ninth method for a KV read operation according to the first aspect of the present application, provided is a fourteenth method for a KV read operation according to the first aspect of the present application, further including: if a third entry indexed by the key (K) exists in the conflict table, the third entry recording the physical address that stores the value (V) to be accessed by the read operation, and reading data from the storage medium according to the physical address recorded in the third entry.

According to the ninth or fourteenth method for a KV read operation according to the first aspect of the present application, provided is a fifteenth method for a KV read operation according to the first aspect of the present application, further including: if the third entry indexed by the key (K) does not exist in the conflict table, indicating that the key accessed by the read operation does not exist.

According to the first method for a KV read operation according to the first aspect of the present application, provided is a sixteenth method for a KV read operation according to the first aspect of the present application, further including: if the corresponding entry of the first part (HK1) of the hash key in the first hash table records the address of the conflict table, querying the conflict table according to the key (K).

According to the sixteenth method for a KV read operation according to the first aspect of the present application, provided is a seventeenth method for a KV read operation according to the first aspect of the present application, further including: if a third entry indexed by the key (K) exists in the conflict table, the third entry recording the physical address that stores the value (V) to be accessed by the read operation, and reading data from the storage medium according to the physical address recorded in the third entry.

According to the sixteenth or seventeenth method for a KV read operation according to the first aspect of the present application, provided is an eighteenth method for a KV read operation according to the first aspect of the present application, further including: if the third entry indexed by the key (K) does not exist in the conflict table, indicating that the key accessed by the read operation does not exist.

According to the second method for a KV read operation according to the first aspect of the present application, provided is a nineteenth method for a KV read operation according to the first aspect of the present application, further including: loading the second hash table from the storage medium.

According to a second aspect of the present application, provided is a first method for a KV write operation according to the second aspect of the present application, including: obtaining a key (K) accessed by a write operation and a physical address assigned for the write operation; performing hash calculation on the key to obtain a hash key (HK); querying a first hash table according to a first part (HK1) of the hash key; and if there is no corresponding entry for the first part (HK1) of the hash key in the first hash table, adding an entry into the first hash table, wherein the entry uses the first part (HK1) of the hash key as an index and records the assigned physical address.

According to the first method for a KV write operation according to the second aspect of the present application, provided is a second method for a KV write operation according to the second aspect of the present application, further including: if a first entry corresponding to the first part (HK1) of the hash key in the first hash table records a physical address that stores a value (V) to be accessed by a read operation, updating the physical address recorded in the first entry to the assigned physical address.

According to the first method for a KV write operation according to the second aspect of the present application, provided is a third method for a KV write operation according to the second aspect of the present application, further including: if a first entry corresponding to the first part (HK1) of the hash key in the first hash table records a physical address that stores a value (V) to be accessed by a read operation, reading first data from the storage medium according to the physical address; and obtaining a first key (Kp) from the first data, and if the first key (Kp) matches the key (K), updating the physical address recorded in the first entry to the assigned physical address.

According to a third method for a KV write operation according to the second aspect of the present application, provided is a fourth method for a KV write operation according to the second aspect of the present application, further including: if the first key (Kp) is not matched with the key (K), creating a second hash table, and creating a second entry and a third entry in the second hash table, where the second entry uses a second part of the hash key corresponding to the first key (Kp) as an index, and records the physical address recorded in the first entry, and the third entry uses a second part (HK2) of the hash key corresponding to the key (K) as an index, and records the assigned physical address; and updating the physical address recorded in the first entry to the address of the second hash table.

According to the first method for a KV write operation according to the second aspect of the present application, provided is a fifth method for a KV write operation according to the second aspect of the present application, further including: if a first entry corresponding to the first part (HK1) of the hash key in the first hash table records a physical address that stores a value (V) to be accessed by a read operation, comparing the length of the first key (Kp) recorded in the first entry with the length of the key (K) to identify whether the first key (Kp) matches the key (K).

According to the fifth method for a KV write operation according to the second aspect of the present application, provided is a sixth method for a KV write operation according to the second aspect of the present application, further including: if the first key (Kp) matches the key (K), updating the physical address recorded in the first entry to the assigned physical address.

According to the fifth or sixth method for a KV write operation according to the second aspect of the present application, provided is a seventh method for a KV write operation according to the second aspect of the present application, further including: if the first key (Kp) is not matched with the key (K), creating a second hash table, and creating a second entry and a third entry in the second hash table, where the second entry uses a second part of the hash key corresponding to the first key (Kp) as an index, and records the physical address recorded in the first entry, and the third entry uses a second part (HK2) of the hash key corresponding to the key (K) as an index, and records the assigned physical address; and updating the physical address recorded in the first entry to the address of the second hash table.

According to one of the first to seventh methods for a KV write operation according to the second aspect of the present application, provided is an eighth method for a KV write operation according to the second aspect of the present application, further including: if the first entry corresponding to the first part (HK1) of the hash key in the first hash table records the address of the second hash table, querying the second hash table according to the second part (HK2) of the hash key.

According to the eighth method for a KV write operation according to the second aspect of the present application, provided is a ninth method for a KV write operation according to the second aspect of the present application, further including: there is no corresponding entry for the second part (HK2) of the hash key in the second hash table, adding an entry into the second hash table, wherein the entry uses the second part (HK2) of the hash key as an index and records the assigned physical address.

According to the eighth or ninth method for a KV write operation according to the second aspect of the present application, provided is a tenth method for a KV write operation according to the second aspect of the present application, further including: if a corresponding fourth entry of the second part (HK2) of the hash key in the second hash table records a physical address that stores a value (V) to be accessed by a read operation, updating the physical address recorded in the fourth entry to the assigned physical address.

According to one of the eighth to tenth methods for a KV write operation according to the second aspect of the present application, provided is an eleventh method for a KV write operation according to the second aspect of the present application, further including: if a corresponding fourth entry of the second part (HK2) of the hash key in the second hash table records a physical address that stores a value (V) to be accessed by a read operation, reading the second data from the storage medium according to the physical address; and obtaining a second key (Kp) from the second data, and if the second key (Kp) matches the key (K), updating the physical address recorded in the fourth entry to the assigned physical address.

According to the eleventh method for a KV write operation according to the second aspect of the present application, provided is a twelfth method for a KV write operation according to the second aspect of the present application, further including: if the second key (Kp) is not matched with the key (K), creating a conflict table, and creating a fifth entry and a sixth entry in the conflict table, where the fifth entry is indexed by the second key (Kp), and records the physical address recorded in the fourth entry, and the sixth entry is indexed by the key (K), and records the assigned physical address; and updating the physical address recorded in the fourth entry to the address of the conflict table.

According to the eighth method for a KV write operation according to the second aspect of the present application, provided is a thirteenth method for a KV write operation according to the second aspect of the present application, further including: if a corresponding fourth entry of the second part (HK2) of the hash key in the second hash table records a physical address that stores a value (V) to be accessed by a read operation, comparing the length of the second key (Kp) recorded in the fourth entry with the length of the key (K) to identify whether the second key (Kp) matches the key (K).

According to the thirteenth method for a KV write operation according to the second aspect of the present application, provided is a fourteenth method for a KV write operation according to the second aspect of the present application, further including: if the second key (Kp) matches the key (K), updating the physical address recorded in the fourth entry to the assigned physical address.

According to the thirteenth or fourteenth method for a KV write operation according to the second aspect of the present application, provided is a fifteenth method for a KV write operation according to the second aspect of the present application, further including: if the second key (Kp) is not matched with the key (K), creating a conflict table, and creating a fifth entry and a sixth entry in the conflict table, where the fifth entry is indexed by the second key (Kp), and records the physical address recorded in the fourth entry, and the sixth entry is indexed by the key (K), and records the assigned physical address; and updating the physical address recorded in the fourth entry to the address of the conflict table.

According to one of the first to fifteenth methods for a KV write operation according to the second aspect of the present application, provided is a sixteenth method for a KV write operation according to the second aspect of the present application, where the length of the first part (HK1) of the hash key is less than that of the hash key (HK).

According to the fourth or seventh method for a KV write operation according to the second aspect of the present application, provided is a seventeenth method for a KV write operation according to the second aspect of the present application, further including: loading the second hash table from the storage medium.

According to a third aspect of the present application, provided is a first KV storage device according to the third aspect of the present application, including a control component, an NVM storage medium, and a memory, where the NVM storage medium records a key (K) and a value (V) written to the storage device; the memory records a first hash table, and the entries in the first hash table are indexed by a first part (HK1) of a hash key (HK), and records the physical address of the value (V) written into the storage device or the address of a second hash table; the memory also records a second hash table, and the entries in the second hash table are indexed by a second part (HK2) of the hash key (HK), and records a physical address of the value (V) written to the storage device or the address of a conflict table; and the entries in the conflict table are indexed by the key (K), and record the physical address of the value (V) written to the storage device.

According to the first KV storage device according to the third aspect of the present application, provided is a second KV storage device according to the third aspect of the present application, where the entries in the first hash table also record the length of the key (K) corresponding to the first part (HK1) of the hash key (HK) as the index thereof.

According to the first or second KV storage device according to the third aspect of the present application, provided is a third KV storage device according to the third aspect of the present application, where the entries in the first hash table also record the length of the key (K) corresponding to the second part (HK2) of the hash key (HK) as the index thereof.

According to one of the first to third KV storage devices according to the third aspect of the present application, provided is a fourth KV storage device according to the third aspect of the present application, where the control component executes one of the methods provided according to the first aspect or the second aspect of the present application.

According to a fourth aspect of the present application, provided is a first KV storage device according to the fourth aspect of the present application, including a control component, an NVM storage medium, and a memory, where the NVM storage medium records a key (K) and a value (V) written to the storage device; the memory records a first hash table and a conflict table, and the entries in the first hash table are indexed by a first part (HK1) of a hash key (HK), and record a physical address of the value (V) written into the storage device or the address of the conflict table; and the entries in the conflict table are indexed by the key (K), and record the physical address of the value (V) written to the storage device.

According to the first or second KV storage device according to the fourth aspect of the present application, where the control component executes one of the methods provided according to the first or second aspect of the present application.

According to a fifth aspect of the present application, provided is a first KV storage device according to the fifth aspect of the present application, including a control component and a non-volatile memory chip, where the control component executes one of the methods provided according to the first aspect or the second aspect of the present application.

According to a sixth aspect of the present application, provided is a first program including a program code according to the sixth aspect of the present application, where when loaded into a CPU and executed in the CPU, the program causes the CPU to execute one of the methods provided according to the first aspect or the second aspect of the present application.

According to a seventh aspect of the present application, provided is a first system for a KV read operation according to the seventh aspect of the present application, including: a key obtaining module, configured to a key (K) accessed by a read operation; a hash key module, configured to perform hash calculation on the key to obtain a hash key (HK); a first hash table query module, configured to query a first hash table according to a first part (HK1) of the hash key; and a value obtaining module, configured to, if a corresponding entry of the first part (HK1) of the hash key in the first hash table records a physical address that stores a value (V) to be accessed by the read operation, read first data from a storage medium according to the physical address.

According to an eighth aspect of the present application, provided is a first system for a KV read operation according to the eighth aspect of the present application, including: a key obtaining module, configured to obtain a key (K) accessed by a write operation and a physical address assigned for the write operation; a hash key module, configured to perform hash calculation on the key to obtain a hash key (HK); a first hash table query module, configured to query a first hash table according to a first part (HK1) of the hash key; and a value address recording module, configured to, if there is no corresponding entry for the first part (HK1) of the hash key in the first hash table, add an entry into the first hash table, wherein the entry uses the first part (HK1) of the hash key as an index and records the assigned physical address.

BRIEF DESCRIPTION OF THE DRAWINGS

To describe the technical solutions in embodiments of the present application or in the prior art more clearly, the accompanying drawings required for describing the embodiments or the prior art are briefly introduced below. Apparently, the accompanying drawings in the following description show merely some embodiments recited in the present application, and a person of ordinary skill in the art can still derive other accompanying drawings from these accompanying drawings.

DETAILED DESCRIPTION

The technical solutions in embodiments of the present application are clearly and fully described below with reference to the accompanying drawings in the embodiments of the present invention. Apparently, the described embodiments are some of the embodiments of the present application, but not all the embodiments. Based on the embodiments of the present application, all other embodiments obtained by a person skilled in the art without involving an inventive effort shall fall within the scope of protection of the present application.

Figure 2:
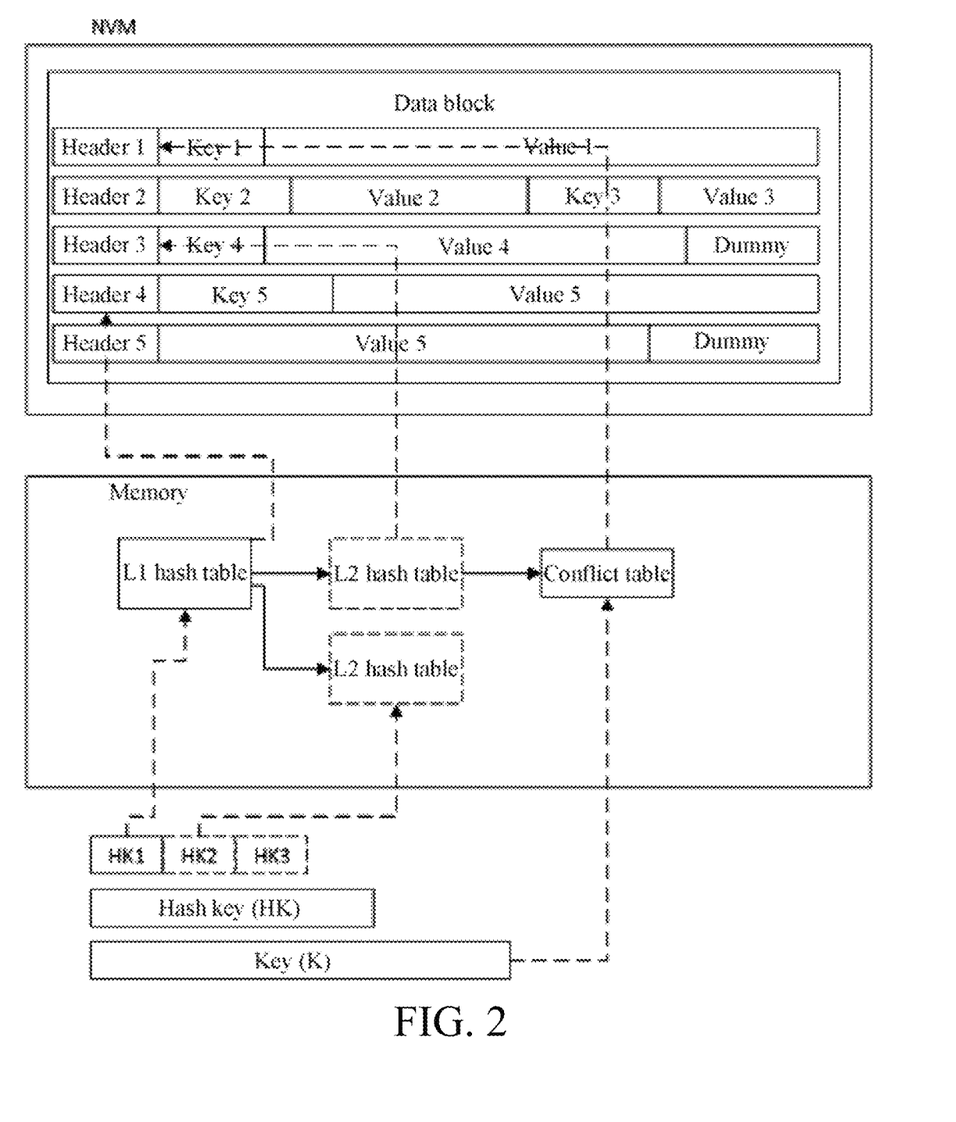
FIG. 2 is a schematic diagram of an address translation system for a solid-state storage device according to an embodiment of the present application.

FIG. 2 is a schematic diagram of an address translation system for a solid-state storage device according to an embodiment of the present application. The NVM chip of a solid-state storage device (also referring to FIG. 1, NVM chip 105) provides multiple physical blocks. The physical blocks are used as data blocks. The data blocks include physical pages or data frames, and configured to record data written to the solid-state storage device.

Taking physical pages as an example, the data block shown in FIG. 2 includes 5 physical pages. Each physical page includes a header field (denoted as "header 1", "header 2" . . . and "header 5" respectively). Each physical page has a physical address (denoted as a PPA), and the corresponding physical page can be accessed by using the PPA. A key (K) and a value are recorded in the physical page, and the key and the value are a key and a value provided by a host when writing data. A header field is also recorded in the physical page, and the header field is used for indicating the starting address and/or length of the key and/or the value.

For example, the physical page indicated by "header 1" in FIG. 2 includes a header field (header 1), a key 1, and a value 1. The header field records the length of the key and the length of the value (while the length of the header field is a fixed value), and the starting address of the key and the starting address of the value can be calculated according to the physical address indicated by the PPA and the length of the header field. In one example, the header field records the length of the key, and the starting address of the value can be calculated according to the physical address indicated by the PPA and the length of the header field, as well as the length of the key. Moreover, in another example, the starting address of the key is fixed, and the header field records the starting address of the value. In another example, the key and the value are of variable length.

Optionally, multiple <key, value> pairs are recorded in the physical page. Taking the physical page indicated by "header 2" as an example, where the recorded "key 2" and "value 2" are a pair, and "key 3" and "value 3" are another pair. Moreover, each pair of <key 2, value 2> and <key 3, value 3> is addressed according to "header 2".

Still optionally, the sum of the lengths of the header field, key, and value of the physical page (for example, the physical page indicated by "header 3" in FIG. 2) is not enough to fill up the physical page, and then the physical page is filled up with dummy data.

The physical pages indicated by "header 4" and "header 5" are physical pages with consecutive physical addresses. Key 5 and "value 5" are a key and a value provided by the host when writing data. Since the size of "value 5" exceeds the volume of the physical page, the physical page indicated by "header 4" records key 5 and a part of value 5 provided by the host, and the remaining part of "value 5" is recorded in the indicated physical page indicated by "header 5". The header fields "header 4" and "header 5" are used for indicating the starting address and/or length of "key 5" and "value 5" in the physical page. Optionally, the number of occupied physical pages (the number is 2) is also recorded in the header field.

Optionally, still referring to the physical pages indicated by "header 4" and "header 5" in FIG. 2, the size of the header field as well as the key and the value is not enough to fill up two physical pages, and the physical page indicated by "header 5" is filled up with dummy data.

Continuing to refer to FIG. 2, the key provided by the host or a user is subjected to hash calculation to obtain a hash key (denoted as HK). Optionally, the key is of variable length and the hash key (HK) has a specified length. The hash key (HK) is divided into multiple parts. For example, the hash key (HK) is divided into three parts, which are denoted as HK1, HK2, and HK3 respectively. For example, for a hash key with a length of 128 bits, HK1 is the first 16 bits of the hash key (HK), HK2 is the next 32 bits of the hash key (HK), and HK3 is the remaining bits of the hash key (HK). Understandably, there are many other ways to divide the hash key (HK) into multiple parts, without limiting the way, order and/or length of the bits of the hash key (HK), etc.

Still referring to FIG. 2, the memory of the solid-state storage device (also referring to FIG. 1, for example, DRAM 110) records various data tables, including an L1 hash table, optionally an L2 hash table and a conflict linked list.

The L1 hash table is indexed by the part HK1 of the hash key (HK). For example, HK1 is taken as an offset value in the L1 hash table to obtain the entry in the L1 hash table. The entry in the L1 hash table records the physical page (or data unit) address of the data block or the address of the L2 hash table.

One or more L2 hash tables are provided. The entry in the L1 hash table optionally records the address of the L2 hash table, so that the L2 hash table can be addressed according to the entry in the L1 hash table. The (each) L2 hash table is indexed by the part HK2 of the hash key (HK). For example, HK2 is taken as an offset value in the L2 hash table to obtain the entry in the L2 hash table. The entry in the L2 hash table records the physical page (or data unit) address of the data block or the address of a conflict table.

One or more conflict tables are provided. The entry in the L2 hash table records the address of the conflict table, so that the conflict table can be addressed according to the entry in the L2 hash table. The (each) conflict table is indexed by the key (K). The entry in the conflict table records the physical page (or data unit) address of the data block.

In an alternative implementation, the L2 hash table is omitted. Moreover, the entry in the L1 hash table records the physical page (or data unit) address of the data block or the address of the conflict table.

Figure 3:
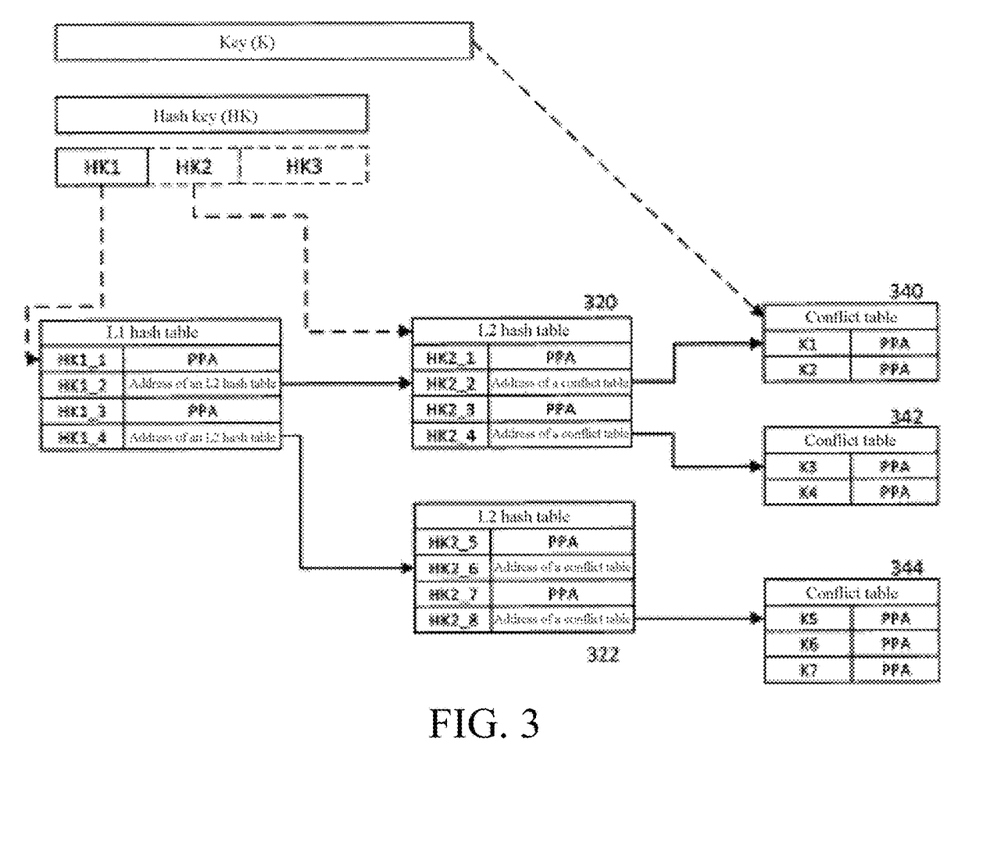
FIG. 3 is a detailed schematic diagram of an address translation system for a solid-state storage device according to an embodiment of the present application.

FIG. 3 is a detailed schematic diagram of an address translation system for a solid-state storage device according to an embodiment of the present application.

Each entry in the L1 hash table is indexed by the part (HK1) of the hash key (HK), and the value of the entry is the address of the physical page (or data unit) of the data block or the address of the L2 hash table. As an example, HK1 is taken as an address to access the entry in the L1 hash table. If the entry in the L1 hash table records the physical page (or data unit) address of the data block, the address indicates the storage location of a <key (K), value (V)> pair in an NVM storage medium.

Understandably, the index HK1 of the L1 hash table is different from the key (K) of the <key (K), value (V)> pair. Moreover, HK1 has no one-to-one correspondence to the key (K), but multiple keys (K) may all correspond to the same HK1. Therefore, there is a certain probability that the <key (K), value (V)> accessed according to the physical page (or data unit) address of the data block indexed by HK1 from the L1 hash table does not correspond to the key accessed by the host/user and used for generating the hash key HK1, resulting in an error. In some cases, the probability of the occurrence of such an error is extremely small, this can be accepted according to the technical standards followed by users or solid-state storage devices. In some other cases, such an error cannot be accepted, and whether the key (K) accessed from the physical page (or data unit) address of the data block indexed from the L1 hash table is the same as the key to be accessed by the user further needs to be determined by comparison, to identify whether the error occurs.

If the entry in the L1 hash table records the address of the L2 hash table, the address indicates the location of one of the L2 hash tables associated with the entry in the memory. Therefore, the entry in the L2 hash table is also associated with HK1.

For example, referring to FIG. 3, in the L1 hash table, the entry indexed by HK1-1 records the physical address PPA, the entry indexed by HK1-2 records the address of the L2 hash table 320, and the entry indexed by HK1-4 records the address of the L2 hash table 322.

Each entry in the L2 hash table is indexed by the part (HK2) of the hash key (HK), and the value of the entry is the address of the physical page (or data unit) of the data block or the address of the conflict table. There are one or more L2 hash tables. FIG. 3 shows an L2 hash table 320 and an L2 hash table 322. As an example, HK2 is taken as an address to access the entry in a specified L2 hash table. The specified L2 hash table is associated with HK1. If the entry in the L2 hash table records the physical page (or data unit) address of the data block, the address indicates the storage location of a <key (K), value (V)> pair in an NVM storage medium. Understandably, the index HK2 of the L2 hash table is different from the key (K) of the <key (K), value (V)> pair. Moreover, HK2 has no one-to-one correspondence to the key (K), but multiple HK2 may all correspond to the same key (K). Moreover, a combination of HK1 and HK2 has no one-to-one correspondence to the key (K), but multiple keys (K) may all correspond to the same combination of HK1 and HK2.

If the entry in the L2 hash table records the address of the conflict table, the address indicates the location of one of the conflict tables associated with the entry in the memory. Therefore, the entry in the conflict table is also associated with the combination of HK1 and HK2.

For example, referring to FIG. 3, in the L2 hash table 320, the entry indexed by HK2-1 records the physical address PPA, and the entry indexed by HK2-2 records the address of the conflict table.

Each entry in the conflict table is indexed by the key (K), and the value of the entry is the physical page (or data unit) address of the data block. FIG. 3 shows a conflict table 340, a conflict table 342, and a conflict table 344. The conflict table is, for example, an array, a linked list, a linear list, or a tree. Optionally, the conflict tables are sorted, for example, according to the numerical values of the keys (K), so as to support quick search of the entry indexed by the key (K) in the conflict table by means of the key (K).

According to the embodiment shown in FIG. 3, each entry in the L2 hash table is associated with HK1 and HK2. Moreover, multiple keys (denoted as K1 and K2) may all correspond to the same combination of HK1 and HK2. For example, a key (K1) and a key (K2) both correspond to the same combination of HK1_2 and HK2_2, so that HK1_2 and HK2_2 obtained according to the key (K1) are associated with the entries in the L2 hash table indicated by HK2_2, and HK1_2 and HK2_2 also obtained according to the key (K2) are associated with the entries in the L2 hash table indicated by HK2_2. In this case, a conflict occurs in the entries in the L2 hash table indicated by HK2_2. To solve the conflict, a conflict table 340 is created to record an association relationship between the key (K1) and a physical address PPA thereof, and also record an association relationship between the key (K2) and a physical address PPA thereof. Moreover, the address of the conflict table 340 is recorded in the entry in the L2 hash table indicated by HK2_2.

Optionally, the L1 hash table and the L2 hash table have a specified size (for example, 1 KB-4 MB), and the number of entries in the conflict table is not limited. Still optionally, the size of the L1 hash table and the size of the L2 hash table are selected so that it can be easily accessed by an operating system or a Memory Management Unit (MMU), and/or can be easily stored in the NVM storage medium.

In an alternative implementation, the L2 hash table is omitted. Moreover, the physical page (or data unit) address of the data block or the address of the conflict table is recorded in the entry of the L1 hash table. When the length of the hash key HK is small, it is advantageous to omit the L2 hash table. This reduces the overhead of querying in an address translation system. In this implementation, the L1 hash table is indexed with the part HK1 of the hash key (HK). If there is a conflict in the L1 hash table, the conflict table is indexed with the key (K) to obtain the physical address PPA corresponding to the key (K). If there is no conflict in the L1 hash table, the physical address PPA is obtained from the entry of the L1 hash table indexed by HK1.

In a still alternative implementation, the solid-state storage device includes multiple address translation systems as shown in FIG. 3. Each name space of the solid-state storage device corresponds to one of the address translation systems as shown in FIG. 3.

Figure 4A:
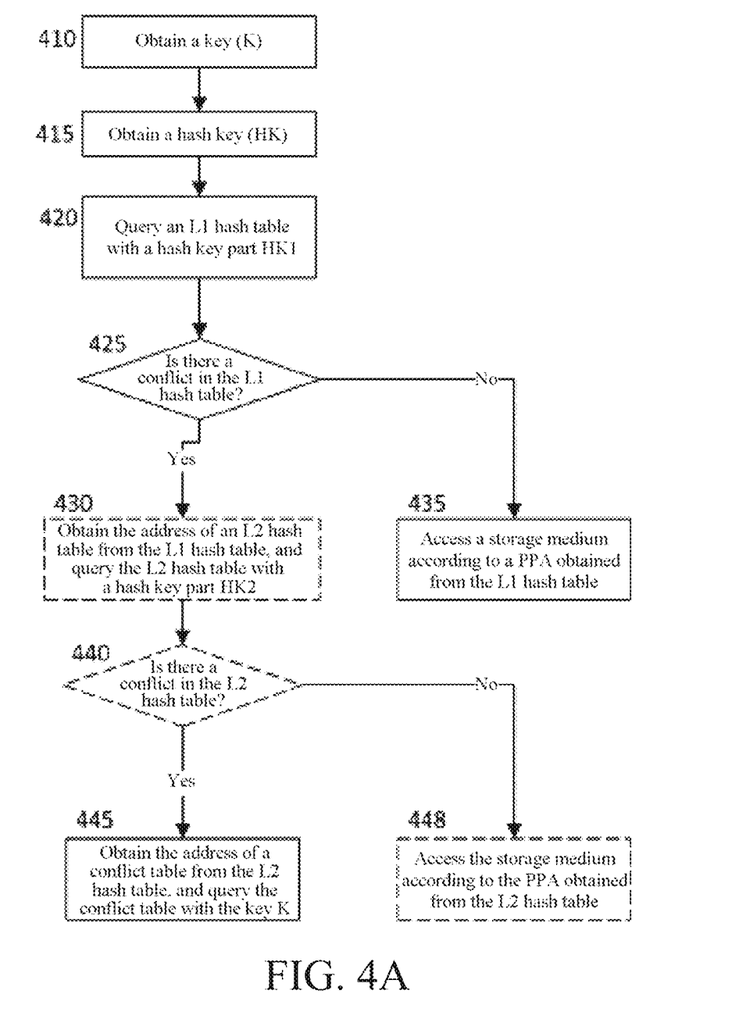
FIG. 4A is a flowchart of address translation performed by a solid-state storage device in response to a read operation (Get(K)) according to the embodiment of FIG. 3.

FIG. 4A is a flowchart of address translation performed by a solid-state storage device in response to a read operation (Get(K)) according to the embodiment of FIG. 3.

A read operation (Get(K)) indicates that a corresponding value is obtained according to a key (K).

In one example, in response to receiving the read operation, the key (K) to be accessed by the read operation is obtained (410). A specified hash operation is performed on the key (K) to obtain a hash key (HK) (415). Moreover, the respective parts (for example, HK1, HK2, and HK3) of the hash key are obtained according to a specified rule. An L1 hash table is queried with the hash key part HK1 (420).

The L1 hash table is queried with the hash key part HK1 to obtain whether there is a conflict for HK1 in the L1 hash table (425). If there is no conflict, an NVM storage medium is accessed according to a physical address PPA obtained from the entry in the L1 hash table indexed by HK1 (435). Since HK1 has no one-to-one correspondence to the key (K), a key (Kp) is also read from the NVM storage medium according to the physical address PPA, and whether the key (Kp) is the same as the key (K) is determined by comparison. If the key (Kp) is the same as the key (K), the value stored in the NVM storage medium in association with the key (Kp) is a value corresponding to the key (K), and this value is taken as the result of the read operation. If the key (Kp) is different from the key (K), the value stored in the NVM storage medium in association with the key (Kp) is not the value corresponding to the key (K), indicating that the value corresponding to the key (K) does not exist in the solid-state storage device.

Optionally, the length of a key (KL1) is also recorded in the entry of the L1 hash table. After the entry of the L1 hash table is obtained according to HK1, whether the length of the key (KL1) recorded in the entry is the same as the length of the key (K) is also determined by comparison, so as to identify that the key (KL1) is different from the key (K) earlier, and it is indicated that the value corresponding to the key (K) does not exist in the solid-state storage device. Understandably, if the length of the key (KL1) is the same as the length of the key (K), it cannot be determined that the key (KL1) matches the key (K), and the key (Kp) needs to be read from the physical address PPA and is compared with the key (K).

Still optionally, in some cases, the probability of obtaining the same HK1 according to different keys (K) is extremely small, and this can be accepted according to the technical standards followed by users or solid-state storage devices. In this case, the NVM storage medium is accessed according to the physical address PPA obtained from the L1 hash table, and the value corresponding to HK1 is read as the result of the read operation, without checking whether the key (Kp) is the same as the key (K). For example, by increasing the length of HK1 (or the ratio of the length of HK1 to the length of the key (K)), the probability of obtaining the same HK1 according to different keys (K) is reduced, and/or by selecting the algorithm of a hash operation, the probability of obtaining the same HK1 according to different keys (K) is reduced.

Referring back to FIG. 4A, if there is a conflict for the hash key part HK1 in the L1 hash table (425), an L2 hash table is accessed according to the address of the L2 hash table obtained from the entry in the L1 hash table indexed by HK1, and the L2 hash table is queried according to the hash key part HK2 index (430).

If there is no conflict for HK2 in the L2 hash table (440), the NVM storage medium is accessed according to the physical address PPA obtained from the entry in the L2 hash table indexed by HK2 (448). Since HK1 has no one-to-one correspondence to the key (K), the key (Kp) is also read from the NVM storage medium according to the physical address PPA to identify whether the value stored at the physical address PPA is the value corresponding to the key (K).

Optionally, similar to the application in the L1 hash table, the length of the key (KL2) is recorded in the L2 hash table, and it is identified that a key (KL2) is different from the key (K) earlier by the means of the length of the key (KL2).

Still optionally, in some cases, the probability of obtaining the same HK1 and HK2 according to different keys (K) is extremely small, and this can be accepted according to the technical standards followed by users or solid-state storage devices. In this case, the NVM storage medium is accessed according to the physical address PPA obtained from the L2 hash table, and the value corresponding to HK2 is read as the result of the read operation, without checking whether the key stored at the physical address PPA is the value corresponding to the key (K).

Referring back to FIG. 4A, if there is a conflict for HK2 in the L2 hash table (440), a conflict table is accessed according to the address of the conflict table obtained from the entry of the L2 hash table indexed by HK2, and the conflict table is queried according to the key (K) (445). If an entry matching the key (K) is found from the conflict table, the NVM storage medium is accessed according to the physical address PPA obtained from the entry, and the value corresponding to the key (K) is read as the result of the read operation. If no entry matching the key (K) is found from the conflict table, it is indicated that the value corresponding to the key (K) does not exist in the solid-state storage device as a response to the read operation.

In an alternative implementation, if there is no conflict for the hash key part HK1 in the L1 hash table (425), it may also be that no entry is found from the L1 hash table according to HK1, indicating the value corresponding to the key (K) does not exist in the solid-state storage device as a response to the read operation. Similarly, if no entry is found from the L2 hash table according to HK2, it is also indicated that the value corresponding to the key (K) does not exist in the solid-state storage device as a response to the read operation.

In an alternative implementation, the L2 hash table is omitted. Moreover, the physical page (or data unit) address of the data block or the address of the conflict table is recorded in the entry of the L1 hash table. Moreover, step 430, step 440, and step 448 in FIG. 4A are omitted. In this implementation, the L1 hash table is indexed with the part HK1 of the hash key (HK). If there is a conflict in the L1 hash table (425), the conflict table is indexed with the key (K) to obtain the physical address PPA corresponding to the key (K).

Figure 4B:
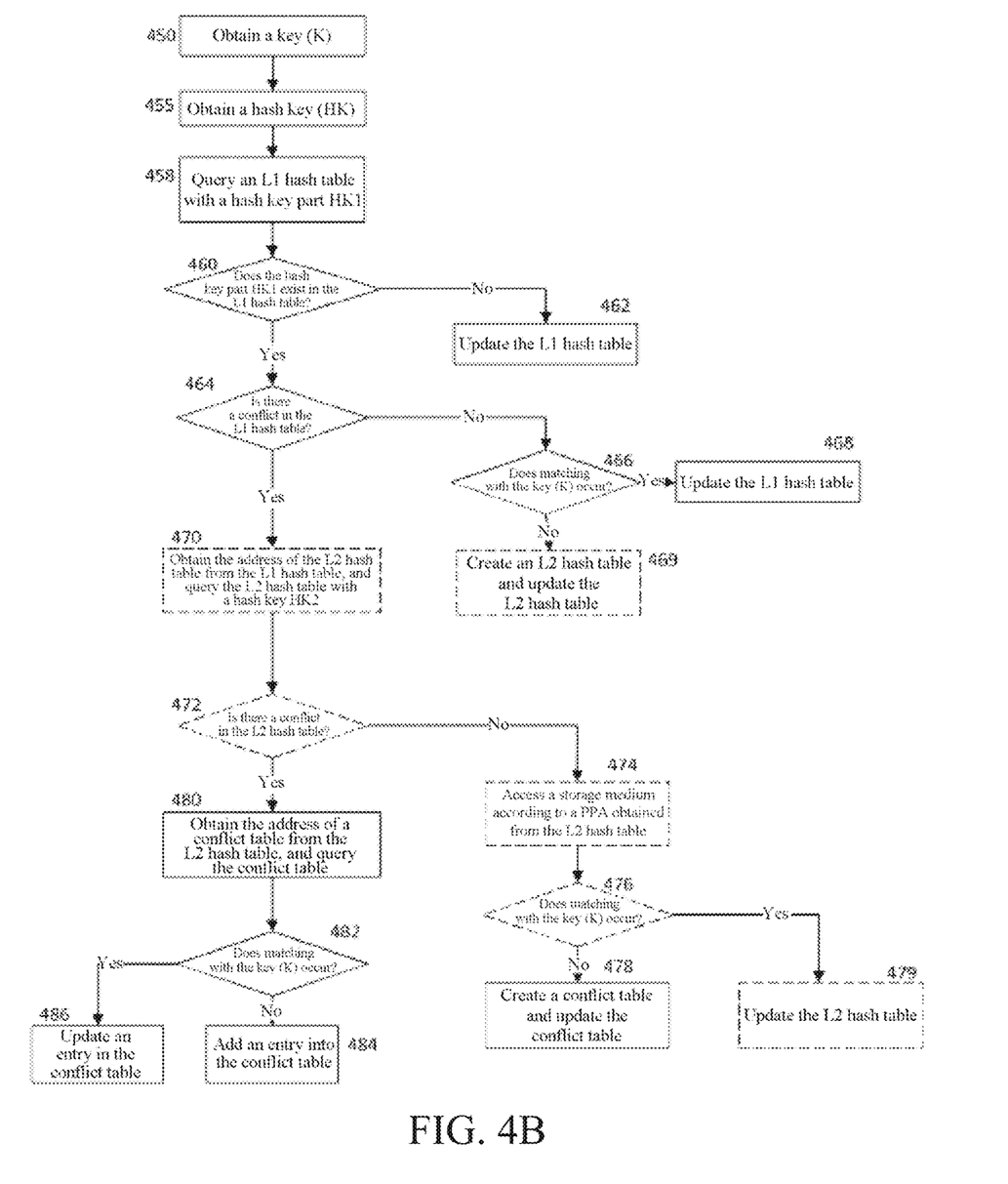
FIG. 4B is a flowchart of address translation performed by a solid-state storage device in response to a write operation (Put (K,V)) according to the embodiment of FIG. 3.

FIG. 4B is a flowchart of address translation performed by a solid-state storage device in response to a write operation (Put (K,V)) according to the embodiment of FIG. 3.

A write operation indicates that a value corresponding to a key (K) is set or updated to a value (V).

According to the embodiment of FIG. 4B, in response to receiving a write operation, the key (K) to be accessed by the write operation is obtained (450), a physical address is assigned for the write operation, and the value (V) of the write operation is written into the assigned physical address PPA.

A specified hash operation is performed on the key (K) to obtain a hash key (HK) (455). Moreover, the respective parts (for example, HK1, HK2, and HK3) of the hash key are obtained according to a specified rule. An L1 hash table is queried with the hash key part HK1 (458).

If HK1 does not exist in the L1 hash table, or there is no entry indexed by HK1 in the L1 hash table (460), the L1 hash table is updated (462), an entry is added in the L1 hash table, the added entry is indexed by HK1, and the assigned physical address PPA is recorded in the entry. Moreover, write operation processing is completed.

If HK1 exists in the L1 hash table (460), whether there is a conflict for HK1 in the L1 hash table is further identified (464). If there is no conflict, a physical address PPA is obtained from the entry in the L1 hash table indexed by HK1 to access an NVM storage medium, a key (Kp) is read from the NVM storage medium, and whether the key (Kp) is the same as the key (K) is determined by comparison (466). If the key (Kp) is the same as the key (K) (466), the physical address recorded in the L1 entry in the hash table indexed by HK1 is updated to the physical address PPA (468), and the write operation processing is completed. If the key (Kp) is different from the key (K) (466), a conflict for the index HK1 is marked in the L1 hash table, a new L2 hash table is generated, an entry with a hash key HK2 Kp obtained from the key (Kp) as an index and the physical address PPA as a value, and an entry with a hash key part HK2 of the key (K) corresponding to the write operation as an index and the assigned physical address as a value are recorded in the new L2 hash table (469).

Optionally, the length of a key (KL1) is also recorded in the entry of the L1 hash table. After the entry of the L1 hash table is obtained according to HK1, whether the length of the key (KL1) recorded in the entry is the same as the length of the key (K) is also determined by comparison, so as to identify that the key (KL1) is not matched with the key (K) earlier (466). Understandably, if the length of the key (KL1) is the same as the length of the key (K), it cannot be determined that the key (KL1) matches the key (K), and the key (Kp) needs to be read from the physical address PPA and is compared with the key (K).

Optionally, the length of a key (KL2) is also recorded in the entry of the L2 hash table. After the entry of the L2 hash table is obtained according to HK2, whether the length of the key (KL2) recorded in the entry is the same as the length of the key (K) is also determined by comparison, so as to identify that the key (KL1) is not matched with the key (K) earlier (476). Understandably, if the length of the key (KL2) is the same as the length of the key (K), it cannot be determined that the key (KL2) matches the key (K), and the key (Kp) needs to be read from the physical address PPA and is compared with the key (K).

Still optionally, in some cases, the probability of obtaining the same HK1 according to different keys (K) is extremely small, and this can be accepted according to the technical standards followed by users or solid-state storage devices. In this case, if there is no conflict for HK1 in the L1 hash table (464), step 466 is skipped, and the physical address recorded in the entry of the L1 hash table indexed by HK1 is updated to the physical address PPA (468).

Still optionally, in some cases, the probability of obtaining the same HK1 and HK2 according to different keys (K) is extremely small, and this can be accepted by the technical standards followed by users or solid-state storage devices. In this case, if there is no conflict for HK2 in the L2 hash table (472), steps 474 and 476 are skipped, and the physical address recorded in the entry of the L2 hash table indexed by HK2 is updated to the physical address PPA (479).

Returning to FIG. 4B, if there is no conflict for HK1 in the L1 hash table (464), the address of the L2 hash table is obtained according to the entry of the L1 hash table indexed by HK1, and the L2 hash table is queried with the hash key part HK2 (470).

If HK2 does not exist in the L2 hash table (not shown), or there is no entry indexed by HK2 in the L2 hash table, the L2 hash table is updated, an entry is added in the L2 hash table, the added entry is indexed by HK2, and the assigned physical address PPA is recorded in the entry. Moreover, write operation processing is completed.

If HK2 exists in the L2 hash table, whether there is a conflict for HK2 in the L2 hash table is further identified (472). If there is no conflict, the physical address PPA is obtained from the entry of the L2 hash table indexed by HK2 to access the NVM storage medium (474), the key (Kp) is read from the NVM storage medium, and whether the key (Kp) is the same as the key (K) is determined by comparison (476). If the key (Kp) is the same as the key (K) (476), the physical address recorded in the entry in the L2 hash table indexed by HK2 is updated to the physical address PPA (479), and the write operation processing is completed. If the key (Kp) is different from the key (K) (476), a conflict for the index HK2 is marked in the L2 hash table, a new conflict table is generated, and an entry with the key (Kp) as an index and the physical address PPA as a value, and an entry with the key (K) corresponding to the write operation as an index and the assigned physical address as a value are recorded in the new conflict table (478).

If there is a conflict for HK2 in the L2 hash table (472), the address of the conflict table is obtained according to the entry of the L2 hash table indexed by HK2, and the conflict table is queried with the key (K) (480). If an entry indexed by the key (K) is found from the conflict table (482), the entry is updated with the assigned physical address PPA (486), and if there is no entry indexed by the key (K) in the conflict table (482), an entry with the key (K) as an index and the assigned physical address PPA as a value is added in the conflict table (484).

In an alternative implementation, the L2 hash table is omitted. Moreover, the physical page (or data unit) address of the data block or the address of the conflict table is recorded in the entry of the L1 hash table. Step 469 is modified to mark a conflict for the index HK1 in the L1 hash table, generate a new conflict table, and record an entry with the key (Kp) as an index and the physical address PPA as a value, and an entry with the key (K) corresponding to the write operation as an index and the assigned physical address as a value in the new conflict table. Moreover, steps 470 and 472 in FIG. 4B are omitted. Step 480 is modified to obtain the address of the conflict table according to the entry of the L1 hash table indexed by HK1, and query the conflict table (480) with the key (K).

Figure 5:
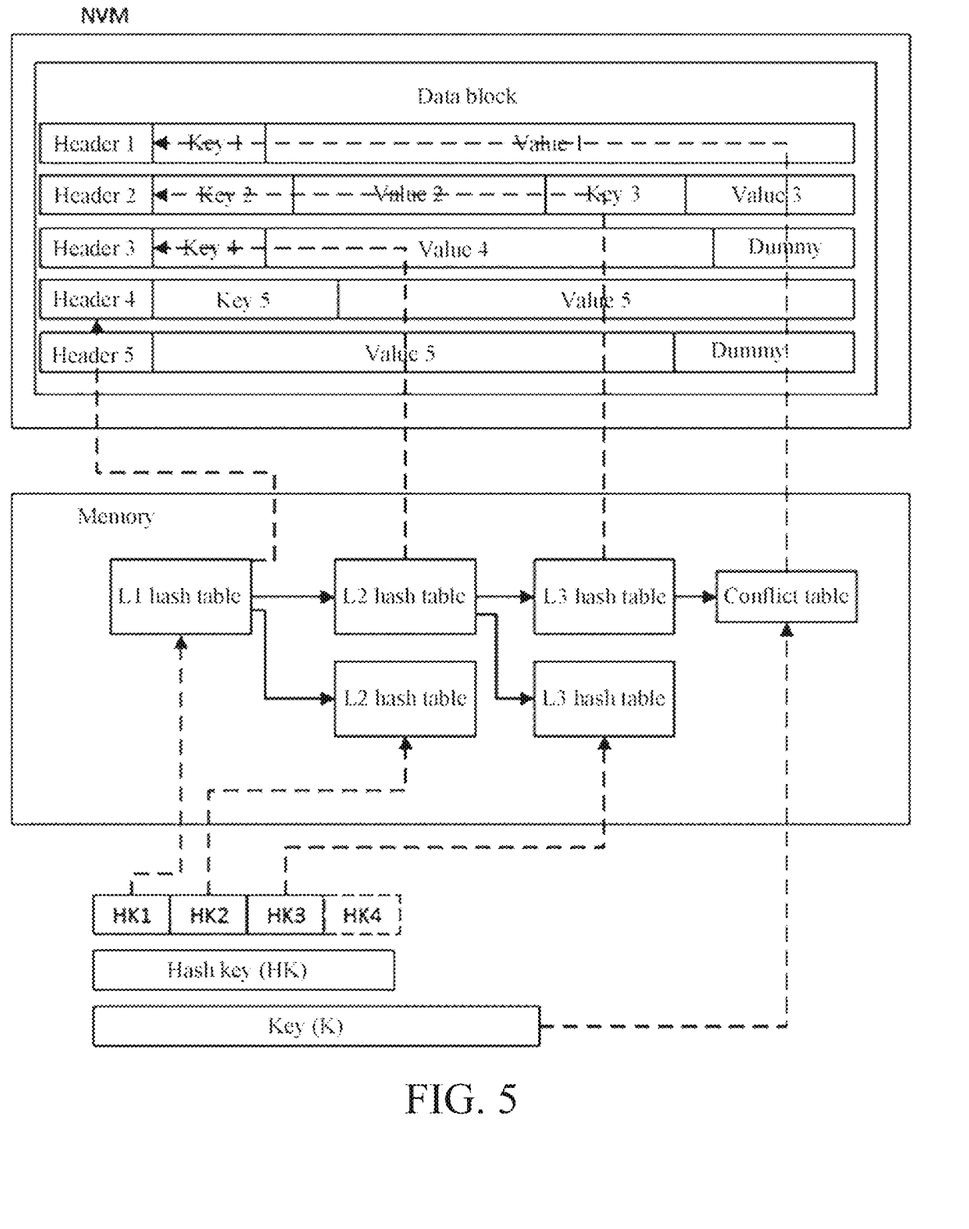
FIG. 5 is a schematic diagram of an address translation system for a solid-state storage device according to another embodiment of the present application.

FIG. 5 is a schematic diagram of an address translation system for a solid-state storage device according to another embodiment of the present application. The NVM chip of a solid-state storage device (also referring to FIG. 1, NVM chip 105) provides multiple physical blocks. The physical blocks are used as data blocks. The data blocks include physical pages or data frames, and configured to record data written to the solid-state storage device.

Continuing to refer to FIG. 5, the key provided by the host or a user is subjected to hash calculation to obtain a hash key (denoted as HK). Optionally, the key is of variable length and the hash key (HK) has a specified length. The hash key (HK) is divided into multiple parts. According to the embodiment shown in FIG. 5, the hash key (HK) is divided into 4 parts, which are recorded as HK1, HK2, HK3, and HK4 respectively. Understandably, the hash key can be divided into other numbers of parts. There are many other ways to divide the hash key (HK) into multiple parts, without limiting the way, order and/or length of the bits of the hash key (HK), etc.

Still referring to FIG. 5, the memory of the solid-state storage device (also referring to FIG. 1, for example, DRAM 110) records various data tables, including an L1 hash table, optionally an L2 hash table, an L3 hash table, and a conflict table.

The L1 hash table is indexed with the part HK1 of the hash key (HK). For example, HK1 is taken as an offset value in the L1 hash table to obtain the entry of the L1 hash table. The entry of the L1 hash table records the physical page (or data unit) address of the data block or the address of the L2 hash table.

One or more L2 hash tables are provided. The entry of the L1 hash table optionally records the address of the L2 hash table, so that the L2 hash table can be addressed according to the entry of the L1 hash table. The (each) L2 hash table is indexed with the part HK2 of the hash key (HK). For example, HK2 is taken as an offset value in the L2 hash table to obtain the entry of the L2 hash table. The entry of the L2 hash table records the physical page (or data unit) address of the data block or the address of the conflict table.

One or more L3 hash tables are provided. The entry of the L2 hash table optionally records the address of the L3 hash table, so that the L3 hash table can be addressed according to the entry of the L2 hash table. The (each) L3 hash table is indexed by the part HK3 of the hash key (HK). For example, HK3 is taken as an offset value in the L3 hash table to obtain the entry of the L3 hash table. The entry of the L3 hash table records the physical page (or data unit) address of the data block or the address of the conflict table.

One or more conflict tables are provided. The entry of the L3 hash table records the address of the conflict table, so that the conflict table can be addressed according to the entry of the L3 hash table. The (each) conflict table is indexed by the key (K). The entry in the conflict table records the physical page (or data unit) address of the data block.

By providing more hash table levels, it is easy to support a larger address space in an address translation system.

Optionally, the L1 hash table, the L2 hash table, the L3 hash table, and/or the conflict table have a specified size, for example, 1 KB-4 MB. The size of the table is selected so that it can be easily accessed by an operating system or a Memory Management Unit (MMU), and/or can be easily stored in an NVM storage medium. For example, when the address space is large, the integrated capacity of the L1 hash table, the L2 hash table, the L3 hash table, and the conflict table also increases, and it is difficult to contain these tables in the memory. Part or all of the L2 hash table, the L3 hash table, and/or the conflict table are exchanged between the memory and the large-capacity NVM storage medium. The accessed L2 hash table, L3 hash table and/or conflict table are loaded into the memory, while the unaccessed L2 hash table, L3 hash table and/or conflict table are stored in the NVM storage medium.

Still optionally, the address translation system according to the embodiment of the present application accesses the L1 hash table, the L2 hash table, the L3 hash table, and/or the conflict table using a virtual address or a physical address for the memory. For the implementation in which the physical address for the memory is used, the entries of the L1 hash table, the L2 hash table, and the L3 hash table record the physical address for the memory of the next-level table.

Moreover, for the implementation in which the virtual address for the memory is used, the entries of the L1 hash table, the L2 hash table, and the L3 hash table record the virtual address for the memory of the next-level table. A storage device also provides an address management system for the virtual address of the memory to the physical address thereof. For example, a memory management system or a memory management unit of a processor provided by the operating system in the prior art is used to provide translation from the virtual address of the memory to the physical address thereof.

The processing flow of performing address translation by a solid-state storage device in response to a read operation (Get(K)) according to the embodiment of FIG. 5 is implemented in a method similar to that shown in FIG. 4A. The processing flow of performing address translation by a solid-state storage device in response to a write operation (Put (K, V)) according to the embodiment of FIG. 5 is implemented in a method similar to that shown in FIG. 4B.

According to the embodiments of the present application, also provided is a solid-state storage device, including a controller and a non-volatile memory chip, where a controller executes any one of the processing methods provided in the embodiments of the present application.

According to the embodiments of the present application, also provided is a program stored on a readable medium, where when the program is run by a controller of a solid-state storage device, the solid-state storage device is caused to execute any one of the processing methods provided in the embodiments of the present application.

Although the preferred embodiments of the present application are described, a person skilled in the art can make additional changes and modifications to these embodiments once knowing the basic creative concept. Therefore, the appended claims are intended to be interpreted as including the preferred embodiments and all changes and modifications falling within the scope of the present application. Obviously, a person skilled in the art can make various changes and modifications to the present application without departing from the spirit and scope of the present application. In this way, if these modifications and variations of the present application fall within the scope of the claims of the present application and equivalent technologies thereof, the present application is also intended to include these modifications and variations.

The invention claimed is:

1. A method for a KV read operation, comprising:
obtaining a key accessed by a read operation;
performing hash calculation on the key to obtain a hash key;
querying a first hash table according to a first part of the hash key;
if a corresponding entry of the first part of the hash key in the first hash table records an address that stores a value to be accessed by the read operation, reading a first data from a storage medium according to the address; and
if the corresponding entry of the first part of the hash key in the first hash table records the address of a second hash table, querying the second hash table according to a second part of the hash key.

2. The method according to claim 1, further comprising:
if there is no corresponding entry for the first part of the hash key in the first hash table, indicating the key accessed by the read operation does not exist.

3. The method according to claim 2, wherein
a length of the first part of the hash key is less than a length of the hash key, and
a length of the second part of the hash key is less than a length of the hash key.

4. The method according to claim 3, further comprising:
obtaining a first key from the first data, and if the first key matches the key, responding to the read operation using the value obtained from the first data.

5. The method according to claim 3, further comprising:
obtaining a length of the first key from the corresponding entry of the first part of the hash key in the first hash table, and comparing the length of the first key with a length of the key to identify whether the first key matches the key.

6. The method according to claim 1, further comprising:
if a corresponding entry of the second part of the hash key in the second hash table records the address storing the value to be accessed by the read operation, reading second data from the storage medium according to the address.

7. A method for a KV write operation, comprising:
obtaining a key accessed by a write operation and an address assigned for the write operation;
performing a hash calculation on the key to obtain a hash key;
querying a first hash table according to a first part of the hash key;
if there is no corresponding entry for the first part of the hash key in the first hash table, adding an entry into the first hash table, wherein the entry uses the first part of the hash key as an index and records the assigned address; and
if a first entry corresponding to the first part of the hash key in the first hash table records an address storing a value to be accessed by a read operation, updating the physical address recorded in the first entry to the assigned address.

8. The method according to claim 7, further comprising:
if a first entry corresponding to the first part of the hash key in the first hash table records the physical address storing a value to be accessed by the read operation, reading a first data from a storage medium according to the physical address; and obtaining a first key from the first data, and if the first key matches the key, updating the address recorded in the first entry to the assigned address.

9. The method according to claim 8, further comprising:
if the first key does not match the key, creating a second hash table, and creating a second entry and a third entry in the second hash table, wherein the second entry uses a second part of the hash key corresponding to the first key as an index, and records the address recorded in the first entry, and the third entry uses a second part of the hash key corresponding to the key as an index, and records the assigned address; and updating the address recorded in the first entry to the address of the second hash table.

10. The method according to claim 7, further comprising:
if the first entry corresponding to the first part of the hash key in the first hash table records the address of the second hash table, querying the second hash table according to the second part of the hash key.

11. The method according to claim 10, further comprising: if there is no corresponding entry for the second part of the hash key in the second hash table, adding an entry into the second hash table, wherein the entry uses the second part of the hash key as an index and records the assigned physical address.

12. The method according to claim 11, further comprising: if a fourth entry corresponding to the second part of the hash key in the second hash table records the physical address storing the value to be accessed by the read operation, updating the physical address recorded in the fourth entry to the assigned physical address.

13. A KV storage device, comprising a control component, an NVM storage medium, and a memory, wherein the NVM storage medium records a key and a value written into the storage device; the memory records a first hash table and a conflict table, and the entries of the first hash table are indexed with a first part of a hash key, and record a physical address of the value written into the storage device or an address of the conflict table; and the entries of the conflict table are indexed with the key, and record the physical address of the value written into the storage device.

* * * * *